(12) United States Patent
Fukunishi (10) Patent No.: US 6,920,341 B2
(45) Date of Patent: Jul. 19, 2005

(54) SECONDARY BATTERY CONTROL CIRCUIT (75) Inventor: Tatsuya Fukunishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 431 days.

(21) Appl. No.: 09/851,105

(22) Filed: May 9, 2001

(65) Prior Publication Data

US 2002/0006814 A1 Jan. 17, 2002

(30) Foreign Application Priority Data

May 16, 2000 (JP) ........................................ 2000-142884

(51) Int. Cl.$^7$ ................................................ H04Q 7/20
(52) U.S. Cl. .................... 455/573; 455/571; 455/572
(58) Field of Search .............................. 455/423, 550.1, 455/571, 572, 573, 574, 127.1, 127.2, 127.3, 127.4, 127.5; 307/18, 19, 21, 36, 71, 63, 65, 54

(56) References Cited

U.S. PATENT DOCUMENTS

| | | | | |
|---|---|---|---|---|
| 5,095,541 A | * | 3/1992 | Aisaka et al. ............... | 455/571 |
| 5,701,597 A | * | 12/1997 | Nakanishi et al. ........ | 455/127.1 |
| 5,867,798 A | * | 2/1999 | Inukai et al. ............... | 455/573 |
| 6,058,320 A | * | 5/2000 | Yokota ........................ | 455/574 |
| 6,377,826 B1 | * | 4/2002 | Kaneko ....................... | 455/573 |

* cited by examiner

Primary Examiner—Jean A Gelin
(74) Attorney, Agent, or Firm—Dickstein Shapiro Morin & Oshinsky LLP (57) ABSTRACT A secondary-battery control circuit is provided. The secondary-battery control circuit includes a first path supplying a first load current from one or more secondary batteries connected in series or parallel to a system, and including a first cutoff switch; and a second path supplying a second load current from the one or more secondary batteries to the system, wherein the first cutoff switch is turned off if a voltage of the one or more secondary batteries is lower than a predetermined voltage, or if the first load current is greater than a predetermined current, thereby cutting off the first load current to the system.

18 Claims, 5 Drawing Sheets

SECONDARY BATTERY CONTROL CIRCUIT

BACKGROUND OF THE INVENTION

1. Field of the Invention

The present invention relates to a charge-discharge control technology of a secondary battery using lithium ion or lithium polymer, or a battery pack including the secondary battery, which is used in a portable device such as a cellular phone, a laptop computer or a portable videotape recorder with a built-in camera.

More particularly, the present invention relates to a secondary-battery control circuit, a battery pack including the secondary-battery control circuit and a portable device using the battery pack, wherein the secondary-battery control circuit is suitable to a battery management system having a remaining-charge indicating IC (Integrated Circuit) used for indicating a remaining charge, or a resetting IC used for resetting the battery management system when a power source has a predetermined voltage, the IC being a typical SBM (Smart Battery Management).

2. Description of the Related Art

A lithium-ion or lithium-polymer secondary battery is widely used in various areas of technologies such as portable devices including a cellular phone, a laptop computer, and a videotape recorder with a built-in camera. The secondary battery is often used as a battery system, by being combined with a remaining-charge indicating IC that indicates a remaining charge of the secondary battery, or a resetting IC that monitors a source voltage of the battery system and outputs a reset signal resetting the battery system when the source voltage becomes a predetermined voltage.

Figure 1:
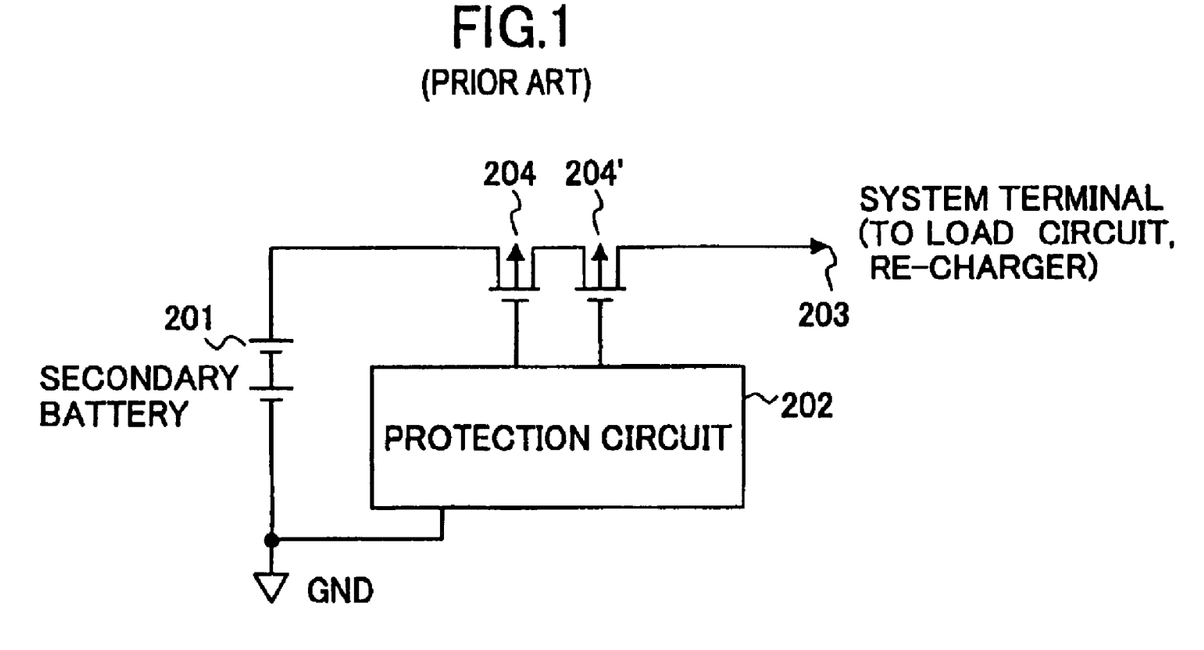
FIG. 1 is a circuit diagram showing a related-art battery system.

FIG. 1 is a circuit diagram showing a related art of the battery system described above. The related-art battery system shown in FIG. 1 includes a secondary battery 201, a protection circuit 202, a system terminal 203, cutoff switches 204 and 204'. The protection circuit 202 controls charge and discharge of the secondary battery, and protects the secondary battery from a damage caused by overcharge. The system terminal 203 is a terminal connected to a system that includes load circuits such as a re-charger, the remaining-charge indicating IC, and the resetting IC. The cutoff switches 204 and 204' are FETs (Field Effect Transistors) that cut off a charging or discharging path between the secondary battery and the above-described system including the re-charger and various load circuits, when the secondary battery is over-charged or over-discharged.

The protection circuit 202 (the secondary-battery control circuit 2) has a function to cancel a charging operation carried out by the re-charger, by turning off the cutoff switch 204 (4), in a case of detecting an abnormal condition such as overcharge of the secondary battery, over-discharge of the secondary battery or an excess current while one of secondary batteries is being charged or discharged. Alternatively, the protection circuit 202 (the secondary-battery control circuit 2) has a function to cancel a power supply, for instance, a voltage and a load current, from the secondary battery to the system, in the case of detecting the abnormal condition while one of the secondary batteries is being charged or discharged.

According to the above-described functions of the protection circuit 202 (the secondary-battery control circuit 2), the related-art battery system shown in FIG. 1 prevents destruction of the secondary battery and a circuit on the system side.

On other hand, in the case in which the power supply from the secondary battery to the system is cut off, the system must select a unit among a plurality of units, and stop an operation of the unit, in accordance with a reason for the power supply being cut off. Thus, the system must use a circuit consisting of external components for providing the power supply to the plurality of units selectively.

The above-described related art has problems described below.

The remaining-charge indicating IC and the resetting IC among various units provided in the battery system must operate until a remaining voltage of the secondary battery becomes less than the lowest operational voltages of units other than the remaining-charge indicating IC and the resetting IC, because of their functions.

However, in a related-art technology, the power supply from the secondary battery to all the circuits including the remaining-charge indicating IC and the resetting IC is cut off, when the overcharge, the over-discharge or the excess current is detected, even in a case in which the remaining voltage of the secondary battery is higher than the lowest operational voltages of the units other than the remaining-charge indicating IC and the resetting IC. Consequently, the remaining-charge indicating IC and the resetting IC cannot function appropriately.

To solve the above-described problem, the related-art battery system shown in FIG. 1 takes steps to supply the power from the secondary battery to the remaining-charge indicating IC and the resetting IC selectively by use of the external components. Recently, portable devices using the secondary battery have become small and thin, as well as their prices have reduced. Usage of the related-art battery system using the external components cannot avoid increases in a total mounting area of the battery system and a production cost.

According to the related-art battery system as described above, the power supply from the secondary battery to the system is cut off when the overcharge, the over-discharge, or the excess current is detected. The battery system using the lithium-ion or lithium-polymer secondary battery is demanded to control monitoring of a voltage condition of the secondary battery in detail, for instance, an overcharging or over-discharging condition, because of characteristics of the battery pack. On the other hand, the battery system is demanded to continue operations performed by the remaining-charge indicating IC or the resetting IC while monitoring a current condition such as the excess current.

The related-art battery system utilizes a method of using the external components, in order to satisfy the above-described demands from the system side. However, according to such a method, the number of the external components increases, and reliability of the system decreases. Additionally, accuracy of setting values related to a power-source cutoff setting for the remaining-charge indicating IC and the resetting IC is hardly improved, and flexibility of setting the values is low, in the case of providing the external components for satisfying the above-described demands, compared to a case of including such components satisfying the above-described demands within the system.

SUMMARY OF THE INVENTION

Accordingly, it is a general object of the present invention to provide a secondary-battery control circuit. A more particular object of the present invention is to provide a secondary-battery control circuit, a battery pack including the secondary-battery control circuit, and a portable device including the battery pack, the secondary-battery control circuit including a circuit that is an external component in a related-art secondary-battery control circuit, in a protection circuit of the secondary-battery control circuit, thereby reducing a total mounting area and a cost of the secondary-battery control circuit, and increasing reliability of the secondary-battery control circuit and accuracy of setting values.

Another object of the present invention is to provide a secondary-battery control circuit that includes a power-supply path to a system other than a related-art power-supply path to the system, thereby increasing accuracy and flexibility of setting values.

The above-described objects of the present invention are achieved by a secondary-battery control circuit, including a first path supplying a first load current from one or more secondary batteries connected in series or parallel, to a system, and including a first cutoff switch; and a second path supplying a second load current from the one or more secondary batteries to the system, wherein the first cutoff switch is turned off if a voltage of the one or more secondary batteries is lower than a first predetermined voltage, or if the first load current is greater than a predetermined current, thereby cutting off the first load current to the system.

The above-described objects of the present invention are also achieved by a battery pack, including one or more secondary batteries connected in series or parallel; and a secondary-battery control circuit, wherein the secondary-battery control circuit includes a first path supplying a first load current from the one or more secondary batteries to a system, and including a first cutoff switch; and a second path supplying a second load current from the one or more secondary batteries to the system, wherein the first cutoff switch is turned off if a voltage of the one or more secondary batteries is lower than a first predetermined voltage, or if the first load current is greater than a predetermined current, thereby cutting off the first load current to the system.

The above-described objects of the present invention are also achieved by a portable device including a battery pack that includes one or more secondary battery connected in series or parallel, and a secondary-battery control circuit; and a load circuit supplied with a load current from the battery pack, wherein the secondary-battery control circuit includes a first path supplying a first load current from one or more secondary batteries connected in series or parallel to a system, and including a first cutoff switch; and a second path supplying a second load current from the one or more secondary batteries to the system, wherein the first cutoff switch is turned off if a voltage of the one or more secondary batteries is lower than a first predetermined voltage, or if the first load current is greater than a predetermined current, thereby cutting off the first load current to the system.

In a related-art secondary-battery control circuit, a circuit, which is used for supplying the power from a secondary battery to units such as a remaining-charge indicating IC and a resetting IC on a system side selectively, is provided as an external component. On the other hand, according to the present invention, reduction of the total mounting area and the cost of the secondary-battery control circuit is achieved by including such a circuit in the secondary-battery control circuit. Additionally, reliability of the secondary-battery control circuit and accuracy of setting values are improved by including the circuit in the secondary-battery control circuit.

Additionally, by providing another power supply path (the second path) in addition to a related-art power supply path (the first path) to the system including units such as the remaining-charge indicating IC and the resetting IC, in the secondary-battery control circuit, the secondary-battery control circuit can improve the accuracy and the flexibility of the setting values.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 2:
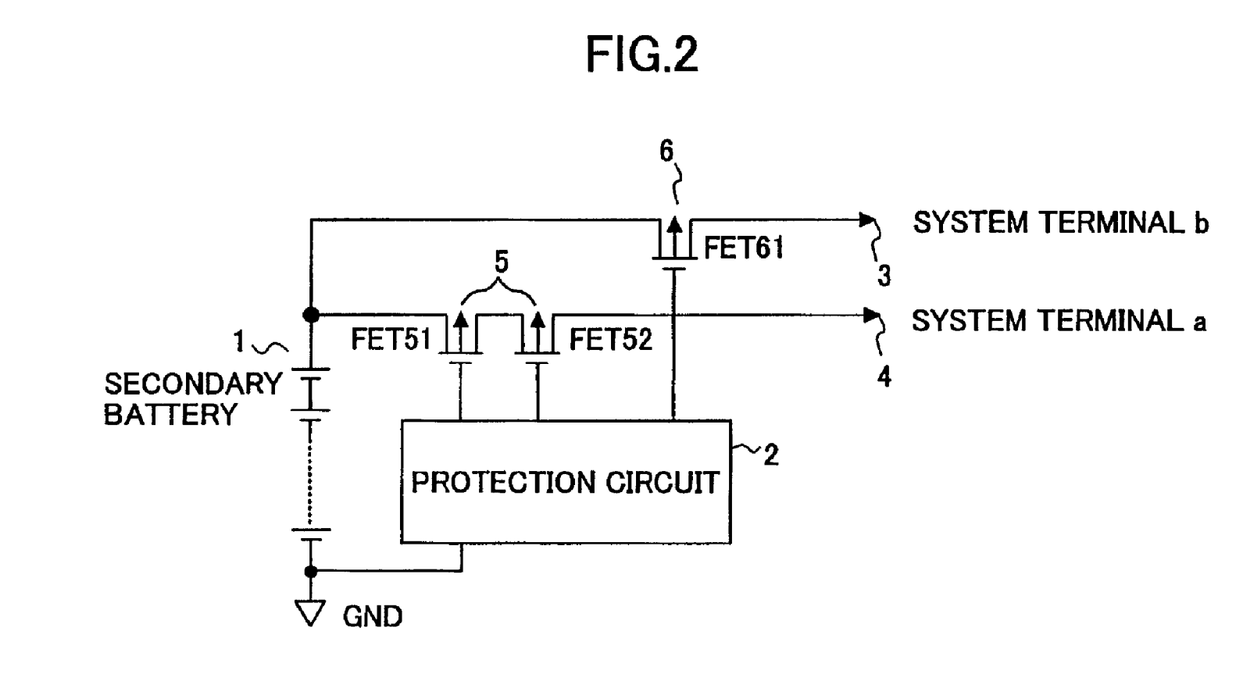
FIG. 2 is a circuit diagram showing a secondary-battery control circuit according to the present invention.

FIG. 2 is a circuit diagram showing a secondary-battery control circuit according to the present invention. The secondary-battery control circuit shown in FIG. 2 includes a secondary battery 1, a protection circuit 2, a system terminal 3 (a system terminal "b"), a system terminal 4 (a system terminal "a"), a first cutoff switch 5, and a second cutoff switch 6 (a FET 61). The first cutoff switch includes a FET 51 and a FET 52.

In the present invention, it is assumed that the secondary battery 1 includes one or more lithium-ion or lithium-polymer batteries connected in series, parallel, or a mixture of series and parallel. FIG. 2 shows the case in which the plurality of lithium-ion or lithium-polymer batteries are connected in series. The first cutoff switches, that are the FET 51 and the FET 52, are connected in series between a terminal of the secondary battery 1 having the highest potential, and the system terminal "a". The second cutoff switch 6 (the FET 61) is connected between the terminal of the secondary battery 1 and the system terminal "b". In the present invention, a FET (Field Effect Transistor) is used as the first cutoff switches 51 and 52, and the second cutoff switch 61.

The system terminal "a" is connected to units or circuits such as a re-charger, to which a power supply can be cut off in a case in which overcharge of the secondary battery 1, over-discharge of the secondary battery 1, or an excess current is detected. The system terminal "b" is connected to units, for example, a remaining-charge indicating IC and a resetting IC that must keep operating even if a remaining charge of the secondary battery 1 becomes lower than the lowest operational voltage of the units connected to the system terminal "a".

Figure 3:
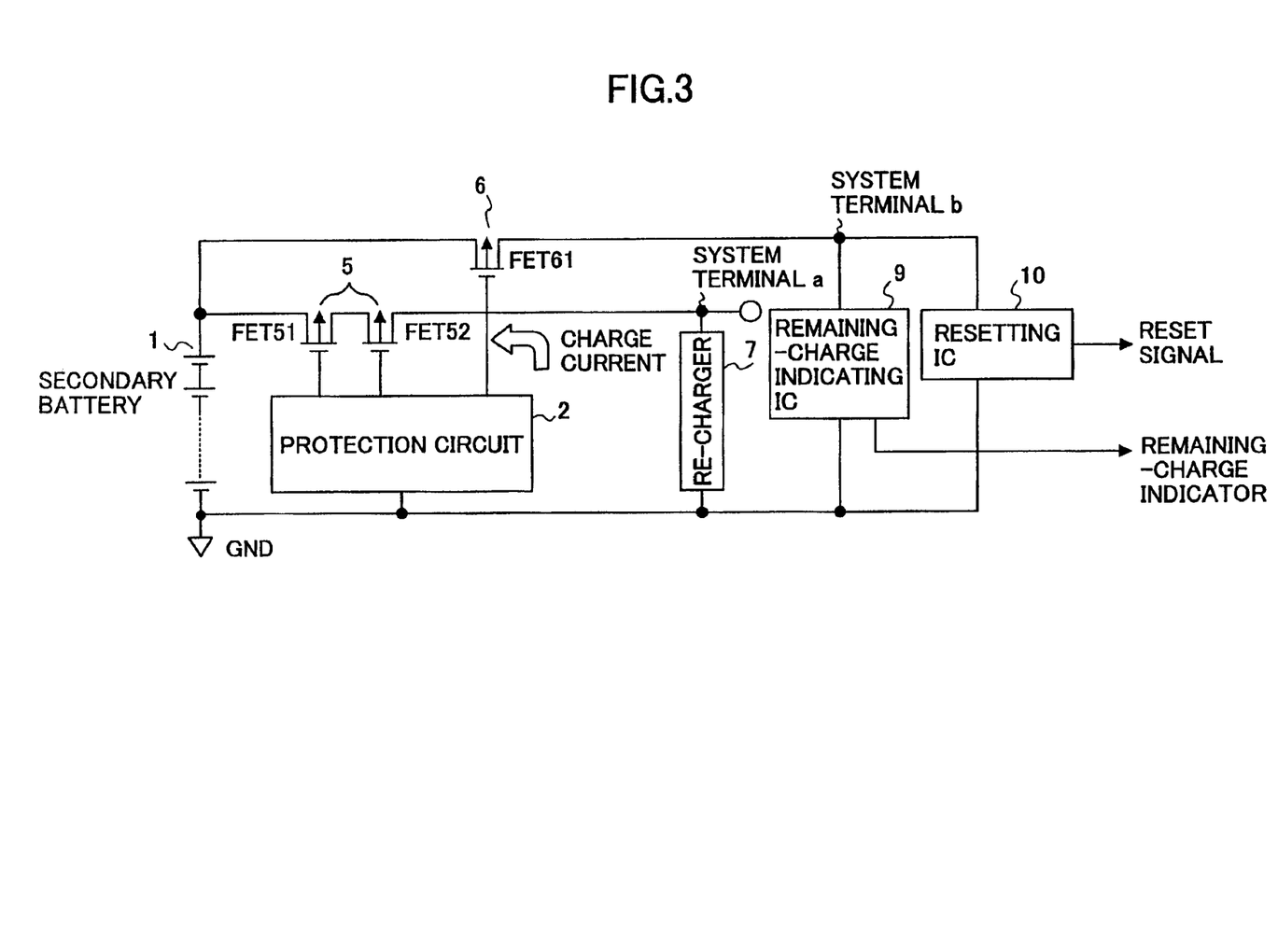
FIG. 3 is a circuit diagram showing an operation performed by the secondary-battery control circuit in a case of charging a secondary battery.
Figure 4:
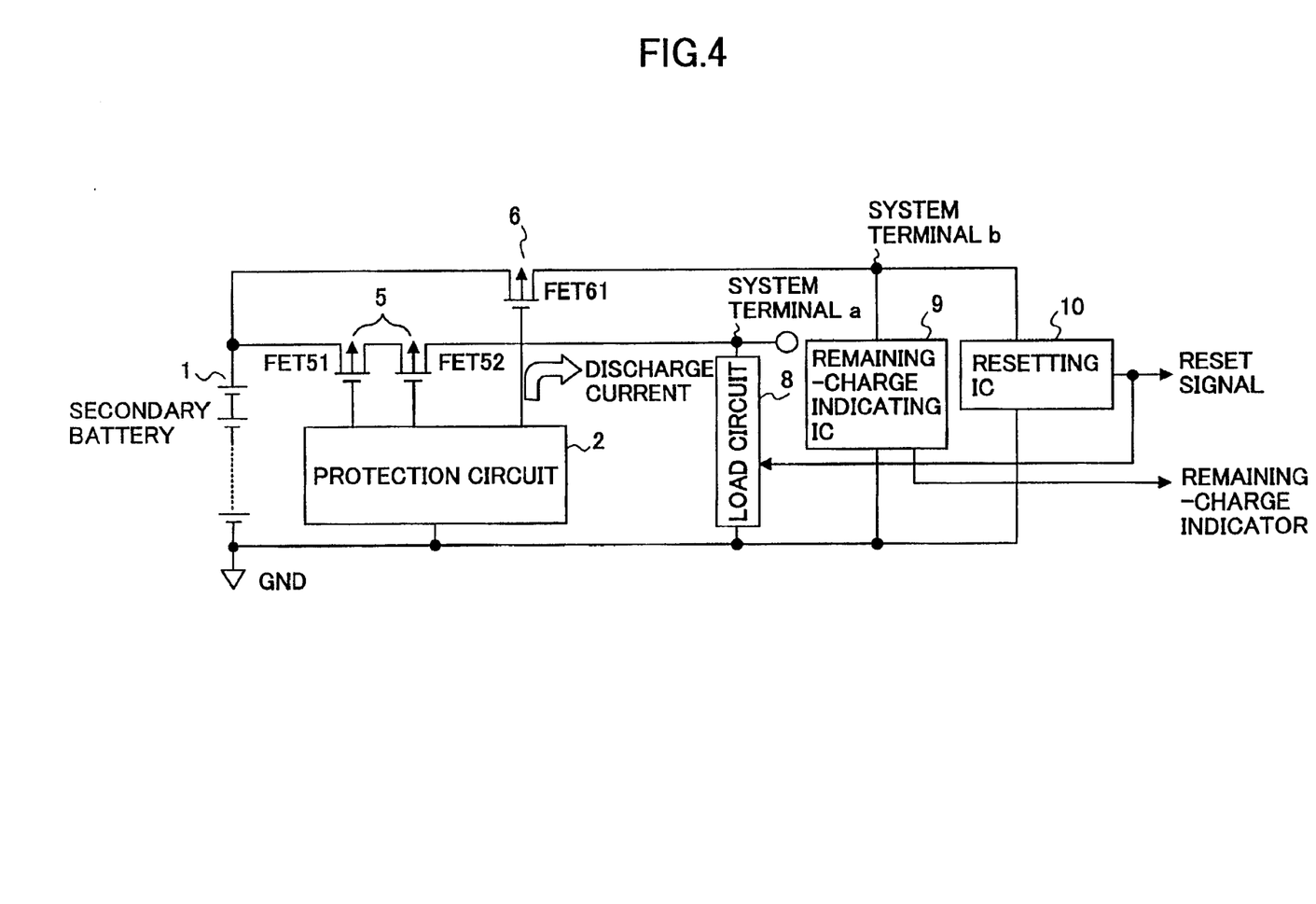
FIG. 4 is a circuit diagram showing an operation performed by the secondary-battery control circuit in a case of discharging the secondary battery.

A description will now be given of operations performed by the secondary-battery control circuit in the cases of charging and discharging the secondary battery 1. FIG. 3 is a circuit diagram showing the operation performed by the secondary-battery control circuit in the case of charging the secondary battery 1. FIG. 4 is a circuit diagram showing the operation performed by the secondary-battery control circuit in the case of discharging the secondary battery 1. In addition, FIG. 5 is a circuit diagram showing a structure of the protection circuit 2 shown in FIGS. 2, 3 and 4.

Figure 5:
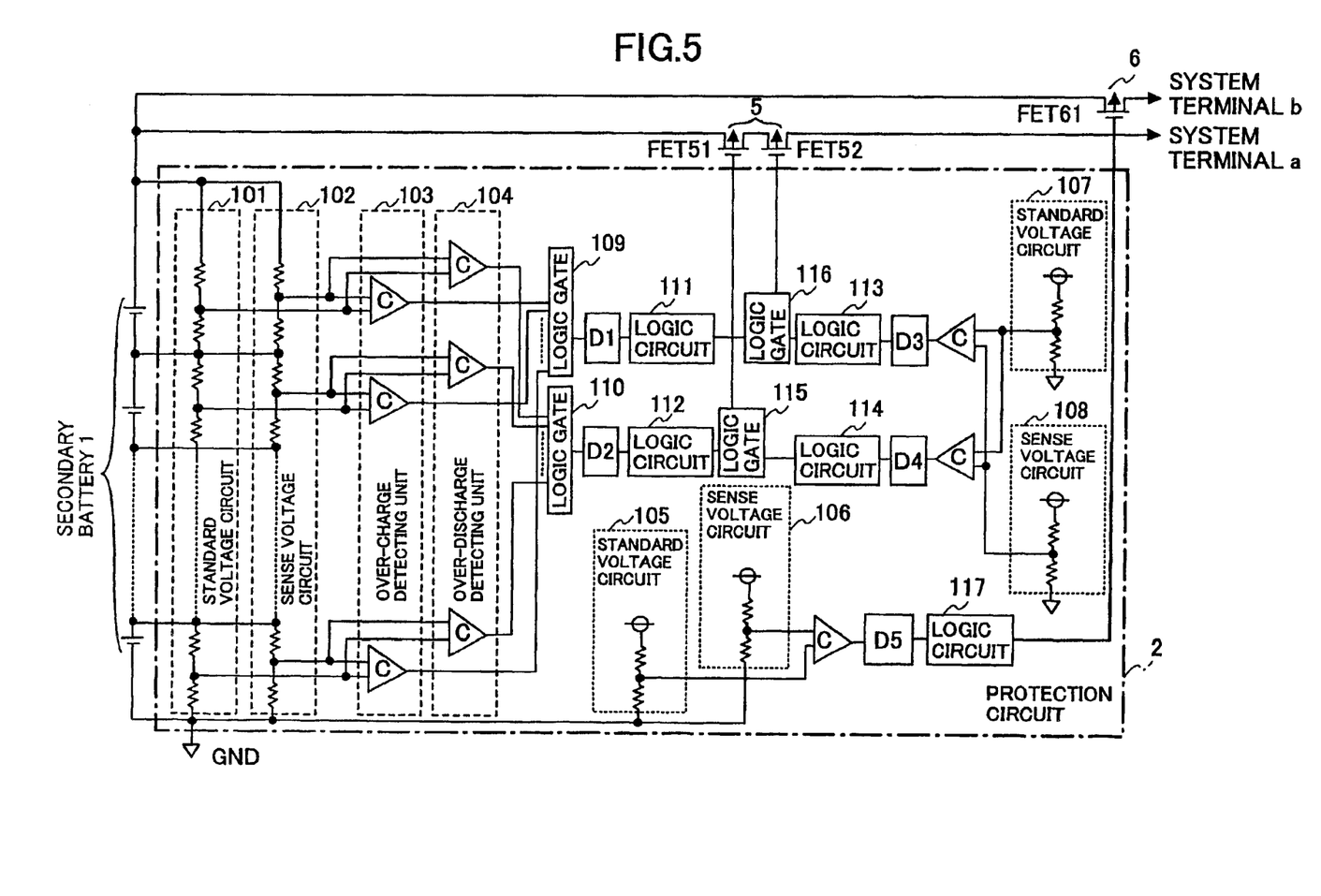
FIG. 5 is a circuit diagram showing a structure of a protection circuit shown in FIGS. 2, 3 and 4.

The protection circuit 2 shown in FIG. 5 includes standard-voltage generating circuits (standard voltage circuits) 101, 105 and 107, sense-voltage generating circuits (sense voltage circuits) 102, 106 and 108, an overcharge detecting unit 103, an over-discharge detecting unit 104, logic gates (logical addition gates) 109, 110, 115 and 116, logic circuits 111, 112, 113, 114 and 117, delay circuits D1 through D5, and a plurality of comparators C.

The cutoff voltage of the first cutoff switch 5 (the FETs 51 and 52) connected to the system terminal "a" is specified by the standard-voltage generating circuits 101 and 107. Additionally, the cutoff voltage of the second cutoff switch 6 (the FET 61) connected to the system terminal "b" is specified by the standard-voltage generating circuit 105.

In the charging operation shown in FIG. 3, a re-charger 7 is connected between the system terminal "a" and a ground voltage GND. Additionally, a remaining-charge indicating IC 9 and a resetting IC 10 are connected between the system terminal "b" and the ground voltage GND. On the other hand, in the discharging operation shown in FIG. 4, a load circuit 8 is connected between the system terminal "a" and the ground voltage GND. Additionally, the remaining-charge indicating IC 9 and the resetting IC 10 are connected between the system terminal "b" and the ground voltage GND.

A description will initially be given of an operation performed by the secondary-battery control circuit in the case of charging the secondary battery 1, with reference to FIG. 3. When the re-charger 7 is connected to the system terminal "a", a charging current flows from the re-charger 7 to the secondary battery 1, and, then, the secondary battery 1 starts being charged. In a case in which a voltage of the secondary battery 1 is higher than the cutoff voltage of the second cutoff switch 6 (the FET 61), the remaining-charge indicating IC 9 and the resetting IC 10 keep operating, which have been connected to the system terminal "b" before the re-charger 7 is connected to the system terminal "a".

In a case in which the voltage of the secondary battery 1 is lower than the cutoff voltage of the second cutoff switch 6, the second cutoff switch 6 is turned off. However, when the voltage of the secondary battery 1 exceeds the cutoff voltage of the cutoff switch 6 as the secondary battery 1 is charged, the second cutoff switch 6 is turned on. In detail, in a case in which a comparator C determines that a voltage at the system terminal "b" detected by the sense-voltage generating circuit 106 is higher than a standard voltage generated by the standard-voltage generating circuit 105, a signal indicating that the voltage at the system terminal "b" is higher than the standard voltage is supplied through the delay circuit D5 and the logic circuit 117, to the second cutoff switch 6. Consequently, the second cutoff switch 6 is turned on.

Accordingly, a voltage is supplied from the secondary battery 1 through the second cutoff switch 6 and the system terminal "b", to the remaining-charge indicating IC 9 and the resetting IC 10, and, then, the remaining-charge indicating IC 9 and the resetting IC 10 start operating. Thus, processes such as a system startup process and a process to calculate and display a voltage capacity of the secondary battery 1 are performed.

If the secondary battery 1 is charged continuously, and becomes overcharged, in other words, if the overcharge detecting unit 103 determines that the voltage of the secondary battery 1 detected by the sense-voltage generating circuit 102 is higher than the standard voltage generated by the standard-voltage generating circuit 101, a signal indicating the overcharge of the secondary battery 1 is supplied through the logic gate 109, the delay circuit D1, the logic circuit 111 and the logic gate 116, to the first cutoff switch 5 (the FET 52). Consequently, the first cutoff switch 5 (the FET 52) is turned off. A power-supply path between the secondary battery 1 and the system terminal "a" is cut off, since the first cutoff switch 5 (the FET 52) is turned off.

However, the secondary battery 1 continues supplying the power to the remaining-charge indicating IC 9 and the resetting IC 10 that are connected to the system terminal "b", through the second cutoff switch 6 that is independent of the first cutoff switch 5 having been turned off. Accordingly, the processes such as the process to calculate and display the voltage capacity of the secondary battery 1 are performed normally. It should be noted that the FET 51 of the first cutoff switch 5 is turned on during the above-described operation.

A description will now be given of an operation performed by the secondary-battery control circuit in the case of discharging the secondary battery 1, with reference to FIG. 4. By setting the cutoff voltage of the second cutoff switch 6 (the FET 61) less than that of the first cutoff switch 5 (the FET 51), the load circuit 8 is electrically connected to the system terminal "a". Consequently, the discharging operation of the secondary battery 1 starts. If the secondary battery 1 is discharged for a certain period, and the voltage of the secondary battery 1 becomes less than the cutoff voltage of the first cutoff switch 5 (the FET 51), the first cutoff switch 5 (the FET 51) is turned off. In detail, if the discharge detecting unit 104 determines that the voltage of the secondary battery 1 detected by the sense-voltage generating circuit 102 is less than the standard voltage generated by the standard-voltage generating circuit 101, a signal indicating that the voltage of the secondary battery 1 is less than the standard voltage is supplied through the logic gate 110, the delay circuit D2, the logic circuit 112 and the logic gate 115, to the first cutoff switch 5 (the FET 51). Consequently, the first cutoff switch 5 (the FET 51) is turned off.

Accordingly, the power supply from the secondary battery 1 to the load circuit 8 is stopped. However, the second cutoff switch 6 (the FET 61) is still turned on, since the cutoff voltage of the second cutoff switch 6 (the FET 61) is less than that of the first cutoff switch 5 (the FET 51). Thus, the remaining-charge indicating IC 9 and the resetting IC 10 connected to the system terminal "b" continues operating, and, for instance, performs the process to calculate and display the voltage capacity of the secondary battery 1.

Subsequently, when the discharging process of the secondary battery 1 continues, and the voltage of the secondary battery 1 becomes less than the cutoff voltage of the second cutoff switch 6 (the FET 61), the second cutoff switch 6 (the FET 61) is turned off. Consequently, the remaining-charge indicating IC 9 and the resetting IC 10, which are connected through the system terminal "a" to the second cutoff switch 6 (the FET 61), cannot be supplied with the power from the secondary battery 1, and stop operating. It should be noted that the FET 52 of the first cutoff switch 5 is turned on during the above-described operation.

A description will now be given of an operation performed by the secondary-battery control circuit when detecting an excess current. In a case in which an excess current whose value being higher than charge/discharge excess-current setting values predetermined in the protection circuit 2 flows through the secondary battery 1 or the first cutoff switch 5, the first cutoff switch (the FET 51 or the FET 52) is turned off. In detail, if it is determined, by comparing the standard voltage generated by the standard-voltage generating circuit 107 and the voltage detected by the sense-voltage generating circuit 108, that the excess current flows while the secondary battery 1 is being charged, a signal is supplied to the first cutoff switch 5 (the FET 52) through the delay circuit D3, the logic circuit 113 and the logic gate 116, indicating that the excess current flows while the secondary battery 1 is being charged. Consequently, the first cutoff switch 5 (the FET 52) is turned off.

On the other hand, if it is determined, by comparing the standard voltage generated by the standard-voltage generating circuit 107 and the voltage detected by the sense-voltage generating circuit 108, that the excess current flows while the secondary battery 1 is being discharged, a signal is supplied to the first cutoff switch (the FET 51) through the delay circuit D4, the logic circuit 114 and the logic gate 115, indicating that the excess current flows while the secondary battery 1 is being discharged. Consequently, the first cutoff switch 5 (the FET 51) is turned off.

In other words, if the excess current flows while the secondary battery 1 is being charged, a path between the secondary battery 1 and the re-charger 7 is cut off because of the FET 52 being turned off. On the other hand, if the excess current flows while the secondary battery 1 is being discharged, a path between the secondary battery 1 and the load circuit 8 is cut off because of the FET 51 being turned off. Accordingly, the battery system is protected from damages caused by the excess current.

However, the second cutoff switch 6 is not turned off as long as the voltage of the secondary battery 1 is higher than the cutoff voltage of the second cutoff switch 6 (the FET 61) even if the excess current is detected. Thus, the power supply from the secondary battery 1 to the system terminal "b" is not stopped, and the remaining-charge indicating IC 9 and the resetting IC 10 continues operating normally.

If the secondary battery 1 includes a plurality of secondary batteries, each of the standard-voltage generating circuit 101, the sense-voltage generating circuit 102, the overcharge detecting unit 103 and the over-discharge detecting unit 104 has a structure to achieve the above-described functions for each secondary battery included in the secondary battery 1. For instance, if the plurality of secondary batteries are connected in series in the secondary battery 1, the overcharge detecting unit 103 or the over-discharge detecting unit 104 compares a voltage of each secondary battery detected by the sense-voltage generating circuit 102, with a standard voltage generated by the standard-voltage generating circuit 101 for each secondary battery. If the overcharge detecting unit 103 or the over-discharge detecting unit 104 detects at least an overcharged secondary battery or an over-discharged secondary battery among the plurality of the secondary batteries, the FET 52 or the FET 51 is turned off respectively through the logic gates 109 and 110.

Additionally, FIG. 5 shows a pair of the standard-voltage generating circuit 101 and the sense-voltage generating circuit 102, and a pair of the standard-voltage generating circuit 107 and the sense-voltage generating circuit 108, for the purpose of simplifying FIG. 5. However, in detail, two pairs of the standard-voltage generating circuit 101 and the sense-voltage generating circuit 102, and two pairs of the standard-voltage generating circuit 107 and the sense-voltage generating circuit 108 are provided in the protection circuit 2. One pair of the standard-voltage generating circuit 101 and the sense-voltage generating circuit 102 is used for detecting the overcharge of the secondary battery 1, and the other pair of the standard-voltage generating circuit 101 and the sense-voltage generating circuit 102 is used for detecting the over-discharge of the secondary battery 1. On the other hand, one pair of the standard-voltage generating circuit 107 and the sense-voltage generating circuit 108 is used for detecting the excess current while the secondary battery 1 is being charged, and the pair of the standard-voltage generating circuit 107 and the sense-voltage generating circuit 108 is used for detecting the excess current while the secondary battery 1 is being discharged.

In a related-art battery system or secondary-battery control circuit, a circuit, which is used for supplying the power from a secondary battery to units such as a remaining-charge indicating IC and a resetting IC on a system side selectively, is provided as an external component. On the other hand, according to the present invention, reduction of the total mounting area of the battery system and the cost is achieved by including such a circuit in the secondary-battery control circuit. Additionally, reliability of the protection circuit and accuracy of setting values are improved by including the circuit in the protection circuit.

Additionally, by providing another power supply path in addition to a related-art power supply path to the system including units such as the remaining-charge indicating IC and the resetting IC, in the secondary-battery control circuit, the secondary-battery control circuit can improve the accuracy and the flexibility of the setting values.

Further, in the case of detecting the overcharge of the secondary battery, or the excess current while the secondary battery is being charged or discharged, the secondary-battery control circuit can achieve a system reset operation and an operation to display the voltage capacity of the secondary battery, by use of the remaining-charge indicating IC and the resetting IC.

Additionally, by including the secondary-battery control circuit according to the present invention in a battery pack, and the battery pack in a portable device, the battery pack and the portable device can achieve the reduction of the total mounting areas of the battery pack and the portable device, and the reduction of the costs. Such a battery pack and a portable device can further improve the reliability of the battery pack and the portable device, and the accuracy of the setting values, by including the circuit, which is an external component in the related-art secondary-battery control circuit, in the protection circuit of the secondary-battery control circuit according to the present invention.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-142884, filed on May 16, 2000, the entire contents of which are hereby incorporated by reference.

What is claimed is:

1. A secondary-battery control circuit comprising:
   a first path supplying a first load current from one or more secondary batteries connected in series or parallel, to a system, and including a first cutoff switch;

a second path supplying a second load current from said one or more secondary batteries to the system, wherein said first cutoff switch is turned off if a voltage of said one or more secondary batteries is lower than a first predetermined voltage, or if the first load current is greater than a predetermined current, thereby cutting off the first load current to the system;

a first standard-voltage generating circuit generating a first standard voltage;

a secondary-battery voltage detecting circuit detecting the voltage of said one or more secondary batteries;

a first comparing circuit comparing said first standard voltage with the voltage of said one or more secondary batteries, to detect whether said one or more secondary batteries are over-discharged;

a second standard-voltage generating circuit generating a second standard voltage;

a first voltage detecting circuit detecting a voltage corresponding to a current flowing through said one or more secondary batteries while said one or more secondary batteries are being discharged; and a second comparing circuit comparing said second standard voltage with the voltage detected by said first voltage detecting circuit, to detect whether an excess current flows through said one or more secondary batteries, wherein said first cutoff switch is controlled based on outputs of said first comparing circuit and said second comparing circuit.

2. The secondary-battery control circuit as claimed in claim 1, wherein said second path includes a second cutoff switch controlled independently of said first cutoff switch.

3. The secondary-battery control circuit as claimed in claim 2, wherein said second cutoff switch is turned off if the voltage of said one or more secondary batteries is higher or lower than a second predetermined voltage.

4. The secondary-battery control circuit, as claimed in claim 1, further comprising:

a third standard-voltage generating circuit generating a third standard voltage;

a third comparing circuit comparing said third standard voltage with the voltage of said one or more secondary batteries, to detect whether said one or more secondary batteries are overcharged;

a fourth standard-voltage generating circuit generating a fourth standard voltage;

a second voltage detecting circuit detecting a voltage corresponding to the current flowing through said one or more secondary batteries while said one or more secondary batteries are being charged; and a fourth comparing circuit comparing said fourth standard voltage with the voltage detected by said second voltage detecting circuit, to detect whether the excess current flows through said one or more secondary batteries, wherein said first cutoff switch is controlled based on outputs of said third comparing circuit and said fourth comparing circuit.

5. The secondary-battery control circuit as claimed in claim 1, wherein said system, to which the second load current is supplied through said second path, includes a remaining-charge indicating IC (Integrated Circuit) used for indicating a remaining charge of said one or more secondary batteries, or a resetting IC used for resetting the system.

6. The secondary-battery control circuit as claimed in claim 1, wherein said first cutoff switch comprises a plurality of transistors.

7. A battery pack, comprising:
one or more secondary batteries connected in series or parallel; and a secondary-battery control circuit, wherein said secondary-battery control circuit includes:

a first path supplying a first load current from said one or more secondary batteries to a system, and including a first cutoff switch;

a second path supplying a second load current from said one or more secondary batteries to the system, wherein said first cutoff switch is turned off if a voltage of said one or more secondary batteries is lower than a first predetermined voltage, or if the first load current is greater than a predetermined current, thereby cutting off the first load current to the system;

a first standard-voltage generating circuit generating a first standard voltage;

a secondary-battery voltage detecting circuit detecting the voltage of said one or more secondary batteries;

a first comparing circuit comparing said first standard voltage with the voltage of said one or more secondary batteries, to detect whether said one or more secondary batteries are over-discharged;

a second standard-voltage generating circuit generating a second standard voltage;

a first voltage detecting circuit detecting a voltage corresponding to a current flowing through said one or more secondary batteries while said one or more secondary batteries are being discharged; and a second comparing circuit comparing said second standard voltage with the voltage detected by said first voltage detecting circuit, to detect whether an excess current flows through said one or more secondary batteries, wherein said first cutoff switch is controlled based on outputs of said first comparing circuit and said second comparing circuit.

8. The battery pack as claimed in claim 7, wherein said second path includes a second cutoff switch controlled independently of said first cutoff switch.

9. The battery pack as claimed in claim 8, wherein said second cutoff switch is turned off if the voltage of said one or more secondary batteries is higher or lower than a second predetermined voltage.

10. The battery pack, as claimed in claim 7, wherein said secondary-battery control circuit further includes:

a third standard-voltage generating circuit generating a third standard voltage;

a third comparing circuit comparing said third standard voltage with the voltage of said one or more secondary batteries, to detect whether said one or more secondary batteries are overcharged;

a fourth standard-voltage generating circuit generating a fourth standard voltage;

a second voltage detecting circuit detecting a voltage corresponding to the current flowing through said one or more secondary batteries while said one or more secondary batteries are being charged; and a fourth comparing circuit comparing said fourth standard voltage with the voltage detected by said second voltage detecting circuit, to detect whether the excess current flows through said one or more secondary batteries, wherein said first cutoff switch is controlled based on outputs of said third comparing circuit and said fourth comparing circuit.

11. The secondary-battery control circuit as claimed in claim 7, wherein said system, to which the second load current is supplied through said second path, includes a remaining-charge indicating IC (Integrated Circuit) used for indicating a remaining charge of said one or more secondary batteries, or a resetting IC used for resetting the system.

12. The battery pack as claimed in claim 7, wherein said first cutoff switch comprises a plurality of transistors.

13. A portable device comprising:

a battery pack that includes one or more secondary battery connected in series or parallel, and a secondary-battery control circuit; and a load circuit supplied with a load current from said battery pack, wherein said secondary-battery control circuit includes:

a first path supplying a first load current from one or more secondary batteries connected in series or parallel to a system, and including a first cutoff switch; and a second path supplying a second load current from said one or more secondary batteries to the system, wherein said first cutoff switch is turned off if a voltage of said one or more secondary batteries is lower than a first predetermined voltage, or if the first load current is greater than a predetermined current, thereby cutting off the first load current to the system;

a first standard-voltage generating circuit generating a first standard voltage;

a secondary-battery voltage detecting circuit detecting the voltage of said one or more secondary batteries;

a first comparing circuit comparing said first standard voltage with the voltage of said one or more secondary batteries, to detect whether said one or more secondary batteries are over-discharged;

a second standard-voltage generating circuit generating a second standard voltage;

a first voltage detecting circuit detecting a voltage corresponding to a current flowing through said one or more secondary batteries while said one or more secondary batteries are being discharged; and a second comparing circuit comparing aid second standard voltage with the voltage detected by said first voltage detecting circuit, to detect whether an excess current flows through said one or more secondary batteries, wherein said first cutoff switch is controlled based on outputs of said first comparing circuit and said second comparing circuit.

14. The portable device as claimed in claim 13, wherein said second path includes a second cutoff switch controlled independently of said first cutoff switch.

15. The portable device as claimed in claim 14, wherein said second cutoff switch is turned off if the voltage of said one or more secondary batteries is higher or lower than a second predetermined voltage.

16. The portable device, as claimed in claim 13, wherein said secondary-battery control circuit further includes:

a third standard-voltage generating circuit generating a third standard voltage;

a third comparing circuit comparing said third standard voltage with the voltage of said one or more secondary batteries, to detect whether said one or more secondary batteries are overcharged;

a fourth standard-voltage generating circuit generating a fourth standard voltage;

a second voltage detecting circuit detecting a voltage corresponding to the current flowing through said one or more secondary batteries while said one or more secondary batteries are being charged; and a fourth comparing circuit comparing said fourth standard voltage with the voltage detected by said second voltage detecting circuit, to detect whether the excess current flows through said one or more secondary batteries, wherein said first cutoff switch is controlled based on outputs of said third comparing circuit and said fourth comparing circuit.

17. The portable device as claimed in claim 13, wherein said system, to which the second load current is supplied through said second path, includes a remaining-charge indicating IC (Integrated Circuit) used for indicating a remaining charge of said one or more secondary batteries, or a resetting IC used for resetting the system.

18. The portable device as claimed in claim 13, wherein said first cutoff switch comprises a plurality of transistors.

* * * * *